(12) United States Patent
Vidyadhara et al.

(10) Patent No.: US 10,019,185 B2
(45) Date of Patent: *Jul. 10, 2018

(54) SYSTEM AND METHOD FOR COPYING DIRECTORY STRUCTURES

(71) Applicant: DELL PRODUCTS, L.P., Round Rock, TX (US)

(72) Inventors: Sumanth Vidyadhara, Bangalore (IN); Ankit Singh, Bangalore (IN); Shekar Babu S, Bangalore (IN); Prasoon Kumar Sinha, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,316

(22) Filed: Mar. 15, 2017

(65) Prior Publication Data

US 2017/0185332 A1    Jun. 29, 2017

Related U.S. Application Data

(63) Continuation of application No. 14/718,339, filed on May 21, 2015, now Pat. No. 9,645,755.

(51) Int. Cl.
| | | |
|---|---|---|
| *G06F 12/00* | (2006.01) | |
| *G06F 3/06* | (2006.01) | |
| *G06F 11/14* | (2006.01) | |
| *G06F 11/20* | (2006.01) | |
| *G06F 17/30* | (2006.01) | |

(52) U.S. Cl.
CPC ............ *G06F 3/0619* (2013.01); *G06F 3/065* (2013.01); *G06F 3/067* (2013.01); *G06F 11/1446* (2013.01); *G06F 11/2056* (2013.01); *G06F 17/30091* (2013.01); *G06F 17/30327* (2013.01)

(58) Field of Classification Search
CPC .... G06F 3/0619; G06F 3/0646; G06F 3/0647; G06F 3/065; G06F 3/067; G06F 11/2056; G06F 11/1446; G06F 17/30091; G06F 17/30327
See application file for complete search history.

(56) References Cited

U.S. PATENT DOCUMENTS

| | | | |
|---|---|---|---|
| 2003/0195903 A1* | 10/2003 | Manley | ............... G06F 11/2066 |
| 2006/0129558 A1 | 6/2006 | Brown et al. | |
| 2006/0212746 A1 | 9/2006 | Amegadzie et al. | |
| 2009/0228511 A1 | 9/2009 | Atkin et al. | |
| 2009/0254579 A1 | 10/2009 | Hazlewood et al. | |

(Continued)

*Primary Examiner* — Shawn X Gu
(74) *Attorney, Agent, or Firm* — Isidore PLLC

(57) ABSTRACT

A method, storage control system and information handling system (IHS) provides copying of a first directory containing a first plurality of files from a client to a target server. The method includes receiving, via a first processor of the client, a request to copy the first directory containing the first plurality of files from a first storage device to the target server. The first directory is parsed into a first i-node tree. Metadata corresponding to the first i-node tree is generated and transmit from the client to the target server. A second processor at the target server is triggered to generate a second directory based on the metadata corresponding to the first i-node tree. The first plurality of files contained in the first directory from the first storage device is transmitted to the target server.

11 Claims, 7 Drawing Sheets

(56) References Cited

U.S. PATENT DOCUMENTS

2010/0115008 A1    5/2010   Nakatani et al.
2011/0307456 A1   12/2011   Jayaraman et al.
2013/0091185 A1    4/2013   Dar et al.

\* cited by examiner

SYSTEM AND METHOD FOR COPYING DIRECTORY STRUCTURES

RELATED APPLICATIONS

This application is a continuation of U.S. patent Ser. No. 14/718,339, filed May 21, 2015, the content of which is fully incorporated herein by reference.

BACKGROUND

1. Technical Field

The present disclosure generally relates to information handling systems and in particular to a system and a method for copying directory structures of information handling systems.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems can operate in a distributed environment and can include a collection of information handling systems in communication with each other including servers, storage devices, desktops and laptops all in communication via local area networks (LANs), wide area networks (WANs) or other networks such as the internet.

Information handling systems can include a variety of hardware and software components that may be configured to process, store, and communicate information and may include one or more computer systems, data storage systems, and networking systems. In order to process and manage the information, a file system may be included in the information handling system. A file system may organize information in the form of files into an easily readable hierarchy to facilitate location and retrieval of the files.

To organize the files, a directory may be created in a file system to group the files associated with a specific application or use. The directory is a hierarchical arrangement of information pertaining to users and systems in an organization. A file may include data specific to the application or use. The directory hierarchy can include a number of levels, with each directory typically being identified by a name. A directory at a lower level is often referred to as a sub-directory and a directory at an immediate higher level as a parent directory. The top level may be referred to as a root level, with files/directories starting from the root. Files can be placed at any level of the hierarchy.

During the operation of the information handling system, it may be necessary to copy or clone part or all of a file system including all or part of a directory from one information handling system or server to another information handling system or server. Cloning can include creating copies of all or part of the stored data.

Unfortunately, the current methods of copying directories and file systems are slow and inefficient. The current methods of copying file systems rely on recursive copy operations for each file component and contents. This causes multiple operations over the network between client and server and server and client in order to complete the copying of individual files.

BRIEF SUMMARY

Disclosed is a method, a storage control system and an information handling system (IHS) for copying a directory containing folders and files from a client to a target server.

According to one embodiment, a method for copying a first directory containing a first plurality of files from a client to a target server is disclosed. The method includes receiving, via a first processor of the client, a request to copy the first directory containing the first plurality of files from a first storage device to the target server. The first directory is parsed into a first i-node tree. Metadata corresponding to the first i-node tree is generated and transmitted from the client to the target server. A second processor at the target server is triggered to generate a second directory based on the metadata corresponding to the first i-node tree. The first plurality of files contained in the first directory from the first storage device is transmitted to the target server.

According to another embodiment, a storage control system for copying a first directory containing a first plurality of files from a client to a target server is disclosed. The storage control system includes a first processor and a first storage device that is communicatively coupled to the first processor via a system interconnect. The first processor has firmware executing thereon to enable copying of the first directory containing the first plurality of files from the client to the target server. The firmware configures the processor to receive a request to copy the first directory containing the first plurality of files from the first storage device to the target server and to parse the first directory into a first i-node tree. Metadata is generated corresponding to the first i-node tree and transmitted from the client to the target server. A second processor at the target server is triggered to generate a second directory based on the metadata corresponding to the first i-node tree. The first plurality of files contained in the first directory is transmuted from the first storage device to the target server.

According to an additional embodiment, an IHS includes a first processor and a first storage device that is communicatively coupled to the first processor via a system interconnect. The first processor has firmware executing thereon to enable copying of a first directory containing a first plurality of files from a client to a target server. The firmware configures the processor to receive a request to copy the first directory containing the first plurality of files from the first storage device to the target server and to parse the first directory into a first i-node tree. Metadata corresponding to the first i-node tree is generated and transmitted from the client to the target server. A second processor at the target server is triggered to generate a second directory based on the metadata corresponding to the first i-node tree. The first plurality of files contained in the first directory is transmitted from the first storage device to the target server.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a storage control system and an information handling system (IHS) for copying a directory containing folders and files from a client to a target server.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
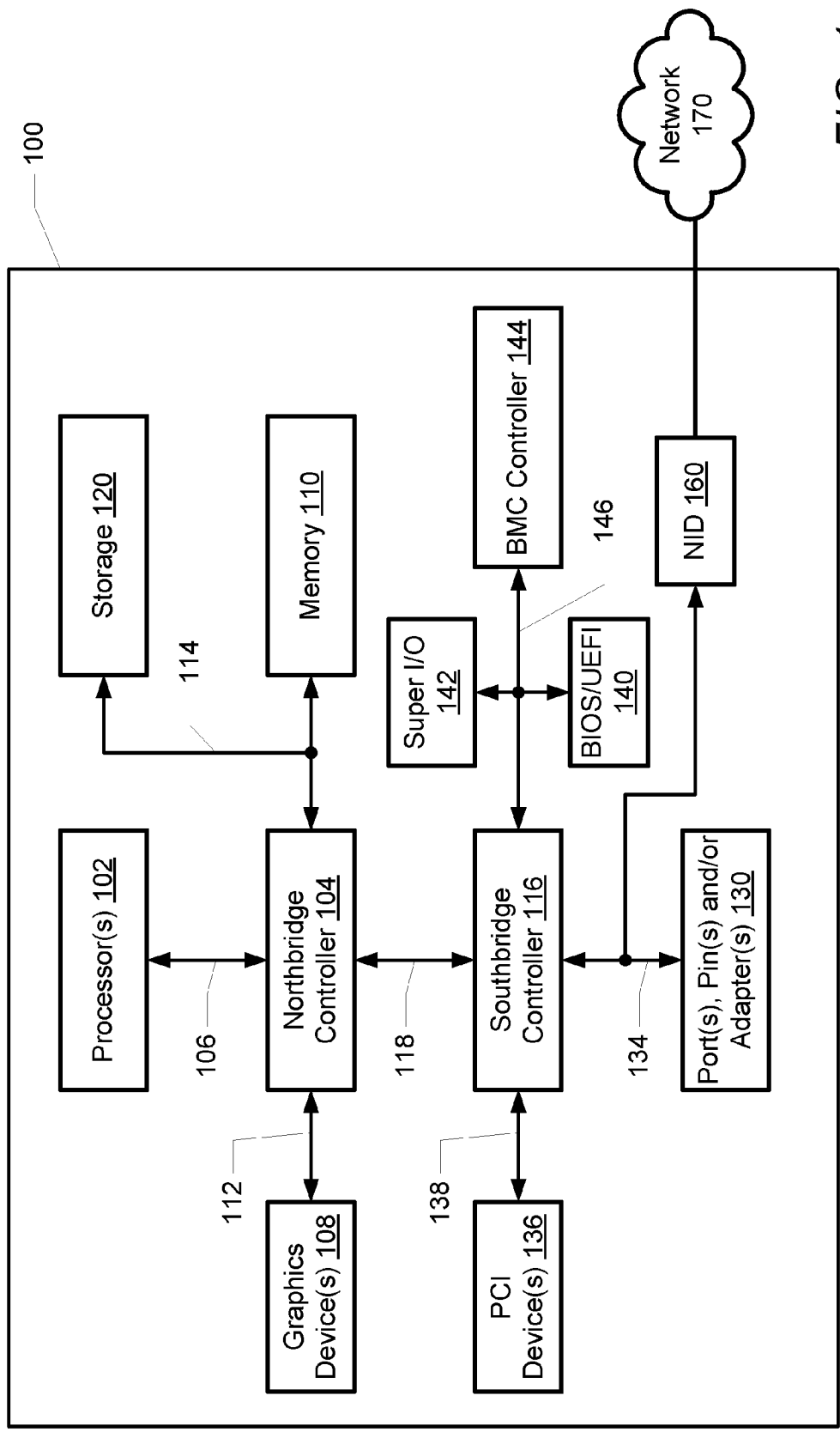
FIG. 1 illustrates one example of an information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown configured to perform baseboard management with distributed intelligence in multi-node platforms according to some embodiments. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 may include any processor capable of executing program instructions. For example, in various embodiments, processor(s) 102 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 102 may commonly, but not necessarily, implement the same ISA. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to northbridge controller or chipset 104 via front-side bus 106. Northbridge controller 104 may be configured to coordinate I/O traffic between processor(s) 102 and other components. For example, in this particular implementation, northbridge controller 104 is coupled to graphics device(s) 108 (e.g., one or more video cards or adaptors, etc.) via graphics bus 112 (e.g., an Accelerated Graphics Port or AGP bus, a Peripheral Component Interconnect or PCI bus, etc.). Northbridge controller 104 is also coupled to system memory 110 via memory bus 114. Memory 110 may be configured to store program instructions and/or data accessible by processor(s) 102. In various embodiments, memory 110 may be implemented using any suitable memory technology, such as static RAM (SRAM), synchronous dynamic RAM (SDRAM), nonvolatile/Flash-type memory, or any other type of memory.

Also coupled to memory bus 114 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100.

Northbridge controller 104 is coupled to southbridge controller or chipset 116 via internal bus 118. Generally, southbridge controller 116 may be configured to handle various I/O operations, and it may provide interfaces such as, for instance, Universal Serial Bus (USB), audio, serial, parallel, Ethernet, etc., via port(s), pin(s), and/or adapter(s) 130 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

Southbridge controller 116 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 is further coupled to one or more PCI devices 136 (e.g., modems, network cards, sound cards, video cards, etc.) via PCI bus 138. Southbridge controller 116 is also coupled to basic input output system/unified extensible firmware interface (BIOS/UEFI) 140, Super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more firmware volumes, each volume having one or more firmware files used by the BIOS' firmware interface to initialize and test components of IHS 100. Super I/O Controller 142 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 110. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via northbridge controller 104 and/or southbridge controller 116.

IHS 100 further comprises a network interface device (NID) 160 coupled to southbridge controller 116 via bus 134. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following an Intel® architecture, various systems and methods described herein may be adapted to work with any other chipset and/or BMC configuration. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 104 may be combined with southbridge controller 116, and/or be at least partially incorporated into processor(s) 102. In other implementations, one or more of the devices or components shown in FIG. 1 may be absent, or one or more other components may be added. Accordingly, systems and methods described herein may be implemented or executed with other computer system configurations.

Figure 2:
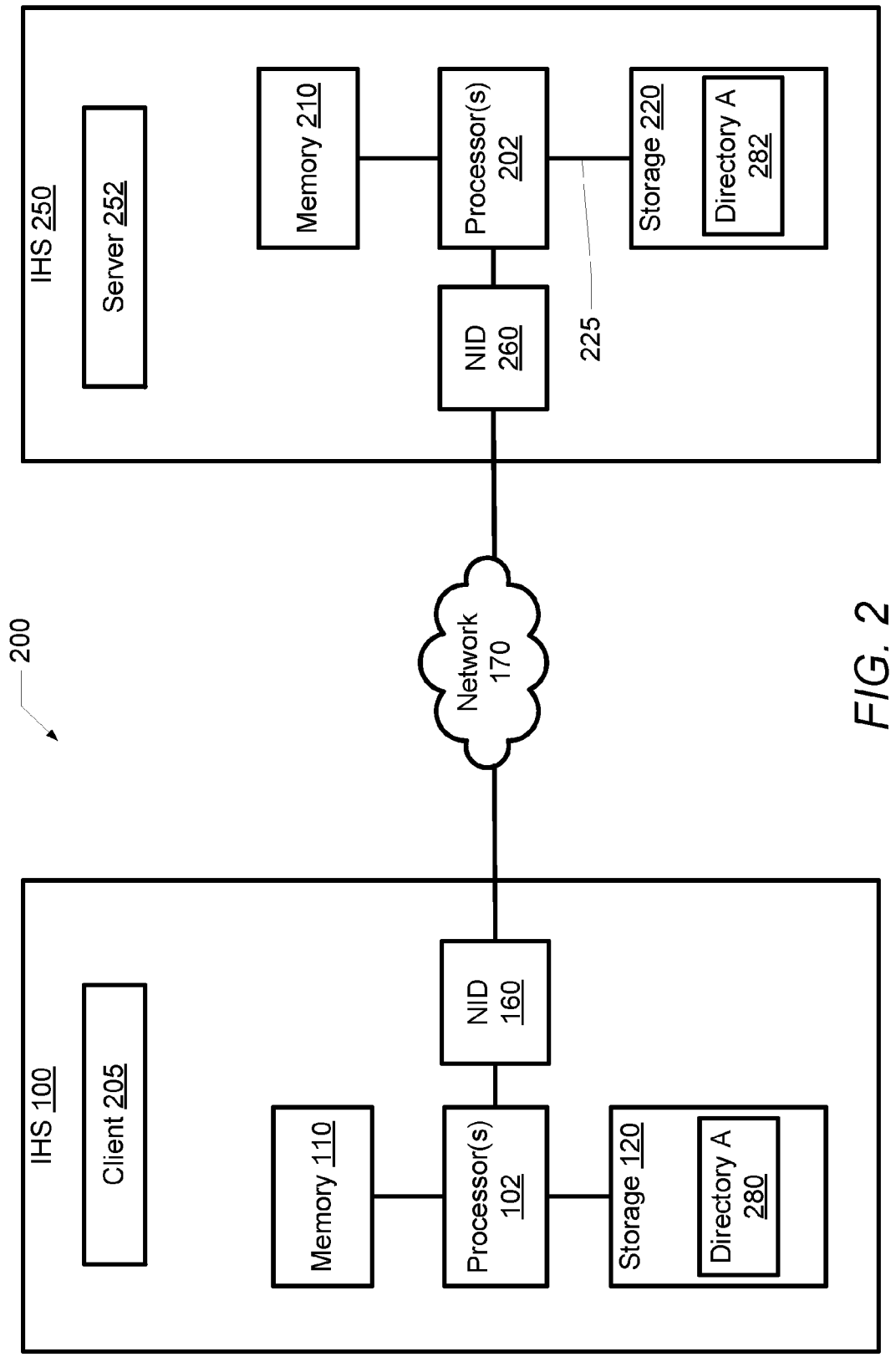
FIG. 2 illustrates an example networked computing environment, including clients and servers in communication via a network, according to one or more embodiments.

Referring to FIG. 2, a networked computing environment or system 200 is shown. In the description of FIG. 2, reference is also made to specific components illustrated within FIG. 1. Networked computing system 200 includes other distributed computing devices or systems such as secondary IHS 250 that is communicatively coupled to IHS 100 via network 170. In one embodiment, IHS 250 includes one or more servers 252 and IHS 250 can be located in the same data center as IHS 100. In another embodiment, IHS 250 can be any number of IHS's with multiple servers 252 (e.g., from a few servers to hundreds of servers) that are located in a plurality of (various) different physical locations. In another embodiment, networked computing system 200 can also include secondary servers and blades.

IHS 100 also includes one or more client(s) 205 that utilize the resources of IHS 100. Client(s) 205 can exchange messages with server(s) 252 in a request-response messaging pattern via network 170. The client 205 sends a request, and the server 252 returns a response. In one embodiment, storage 120 can store one or more directories such as directory A 280. Directory A 280 is a hierarchical arrangement of information and data. Directory A 280 contains a group of folders, files and data organized and associated with a specific application or use within storage 120.

IHS 250 includes a processor(s) 202 that is coupled to system memory 210, storage 220 and NID 260. NID 260 enables IHS 250 to communicate and/or interface with IHS 100 via example network 170 using one or more communication protocols. In one embodiment, storage 220 can store one or more directories such as directory A 282. In one embodiment, directory A 282 can be a copy or clone of directory A 280 of storage 120.

Figure 3:
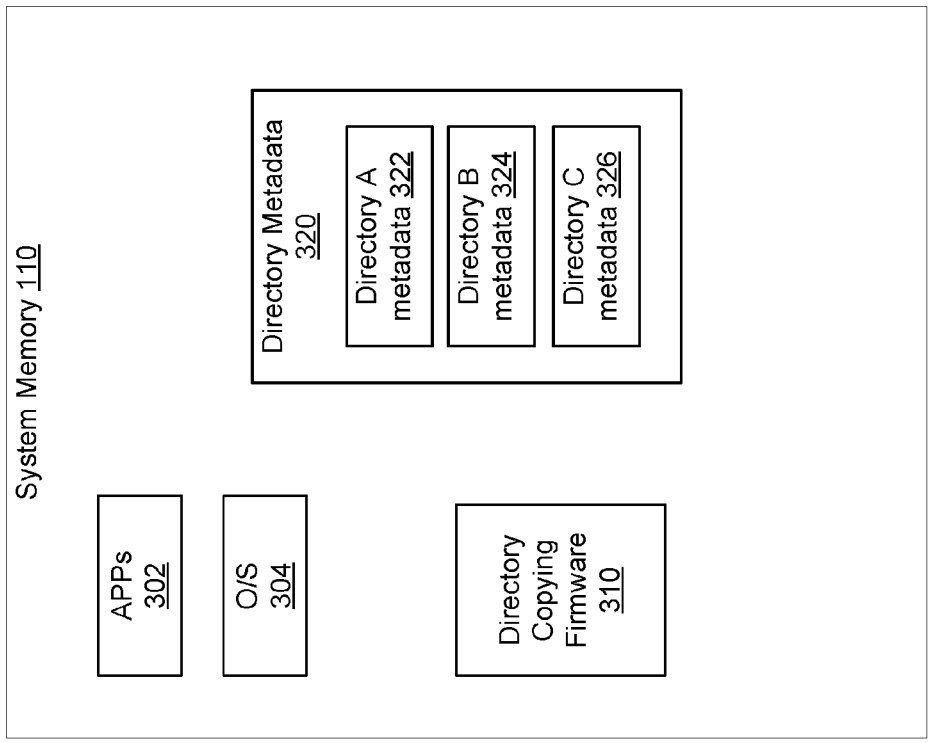
FIG. 3 illustrates example contents of a client system memory that includes firmware to support copying of directories, in accordance with one embodiment.

With reference now to FIG. 3, one embodiment of example contents of system memory 110 of IHS 100 is shown. In the description of FIG. 3, reference is also made to specific components illustrated within FIGS. 1 and 2. System memory 110 includes data, software, and/or firmware modules including application(s) 302, and operating system (O/S) 304. System memory 110 also includes directory copying firmware module 310 that enables efficient copying of at least one directory and file from storage 120 of client 205 to storage 220 of target server 252 (FIG. 2). Directory copying firmware module 310 is a software and/or firmware module that executes on processor 102 to facilitate efficient copying of directories and files from storage 120 of IHS 100 to storage 220 of IHS 250 (FIG. 2). In one embodiment, directory copying firmware module 310 can be part of BIOS/UEFI 140.

System memory 110 further includes directory metadata 320. Directory metadata 320 stores directory A metadata 322, directory metadata 324 and directory C metadata 326. Directory metadata 322-326 is data about the data of directories A, B and C. Directory metadata 322-326 can include information such as file names, file identifiers, parent identifiers, directory identifier, file mode, user identifier, group identifier, file size in bytes, file access restrictions (e.g., read and/or write), execute permissions, and type.

Figure 4:
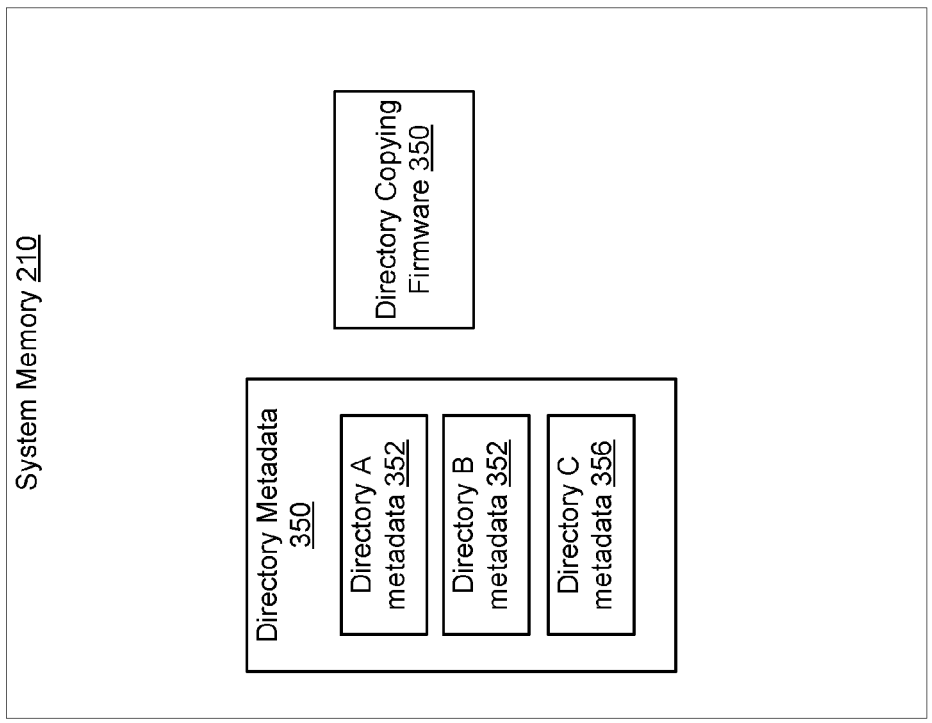
FIG. 4 illustrates example contents of a server system memory that includes firmware to support copying of directories, in accordance with one embodiment.

Referring to FIG. 4, one embodiment of example contents of system memory 210 of IHS 250 is shown. In the description of FIG. 4, reference is also made to specific components illustrated within FIGS. 1-3. System memory 210 includes directory copying firmware module 350 that enables efficient copying of at least one directory and file from storage 120 of client 205 to storage 220 of target server 252 (FIG. 2). Directory copying firmware module 350 is a software and/or firmware module that executes on processor 202 to facilitate efficient copying of directories and files transmitted from storage 120 of IHS 100 to storage 220 of IHS 250.

Figures 5A, 5B:
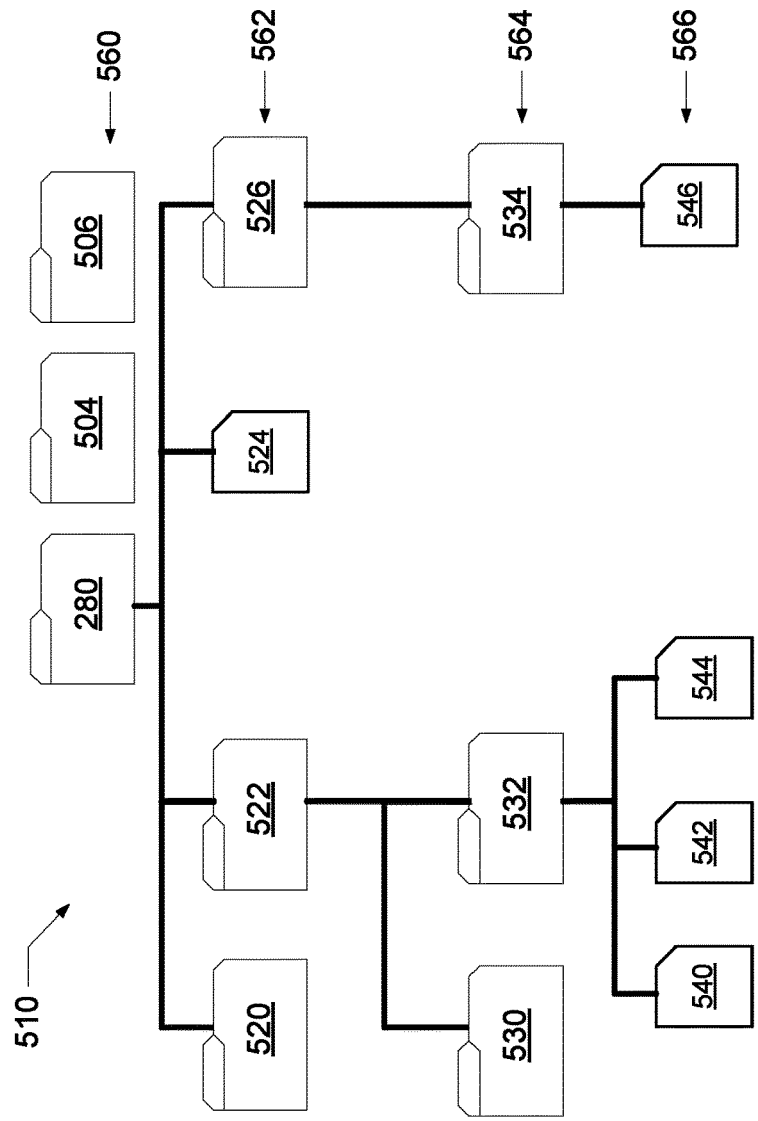
FIG. 5A illustrates example contents of a client storage device, in accordance with one embodiment.
FIG. 5B illustrates an example i-node tree, in accordance with one embodiment.

FIG. 5A illustrates one embodiment of example contents of storage 120 (FIG. 1). Storage 120 can store a file system 500 including directories A 280, B 504 and C 506. Directories 280, 504, 506 organize a group of files associated with a specific application or use. Directories 280, 504, 506 are a hierarchical arrangement of information and data within IHS 100. Directories 280, 504, 506 can store a wide variety of information, programs and data for use by IHS 100 and for transmission to IHS 250 via network 170 (FIG. 2).

With additional reference to FIG. 5B, one embodiment of an index node (i-node) tree 510 is shown. File system 500 can be represented by i-node tree 510. An i-node tree is a data structure used to represent file system objects, which can include files of data or directories. The i-node tree representing the file can include specific information, called metadata. In one embodiment, an i-node may have an integer number assigned to the i-node to uniquely identify the i-node within the file system.

The metadata of file system 500 can be stored in files of storage 120. Directory A 280 can store metadata file 322. Directory B 504 can store metadata file 324. Directory C 506 can store metadata file 326. Directory metadata 322-326 is data about the data of directories A, B and C. Directory metadata 322-326 can include information such as file names, file identifiers, parent identifiers, directory identifier, file mode, user identifier, group identifier, file size in bytes, file access restrictions (e.g., read and/or write), execute permissions, and type.

With continued reference to FIG. 5B, I-node tree 510 includes directories 280, 504, 506. Directories 280, 504, 506 can be called root directories. A directory has a number of levels including the top or root level 560 and sub-levels 562, 564 and 566. Each directory can be identified by a name or a number. Sub-level 562 has folders or sub-directories 520, 522 and 526. Sub-level 562 also contains a file or data file 524. Files can be stored at any level of directory 280. Sub-level 564 has sub-directories 530, 532 and 534. Sub-level 566 has files 540, 542, 544 and 546.

In one embodiment, i-node tree 510 is converted to an encoded pattern using a depth first search algorithm. The encoded pattern can be generated by representing i-nodes in a string pattern. The same string pattern can be used to re-construct the i-node tree again at target server 252 (FIG. 2). For directory A 280, the data of the i-node can include the following data:
Name: D0//!<Directory/File name
ID: 0//!<Directory/File ID
PID: 1//!<Parent ID
File Type: 0//!<0☐ Directory
Mode: 511//!<File mode
UID: 100//!<User ID
GID: 1000//!<Group ID
Size: 4096//!<File size in bytes The depth first search algorithm can parse through the i-node tree in the pre-order fashion and encode each i-node in meta-data. Directory A 280 can be encoded as:
[D|0|0|1|0|511|100|1000|4096]
File 544 can be encoded as:
[F33|16|15|0|511|100|1000|965536]

The encoded meta-data 322 representing the i-node tree 510 is stored in a buffer along with the respective file data (i.e. folders 520, 522, 526, 530, 532, 534, and files 524, 540, 542, 544 and 546).

Figure 5C:
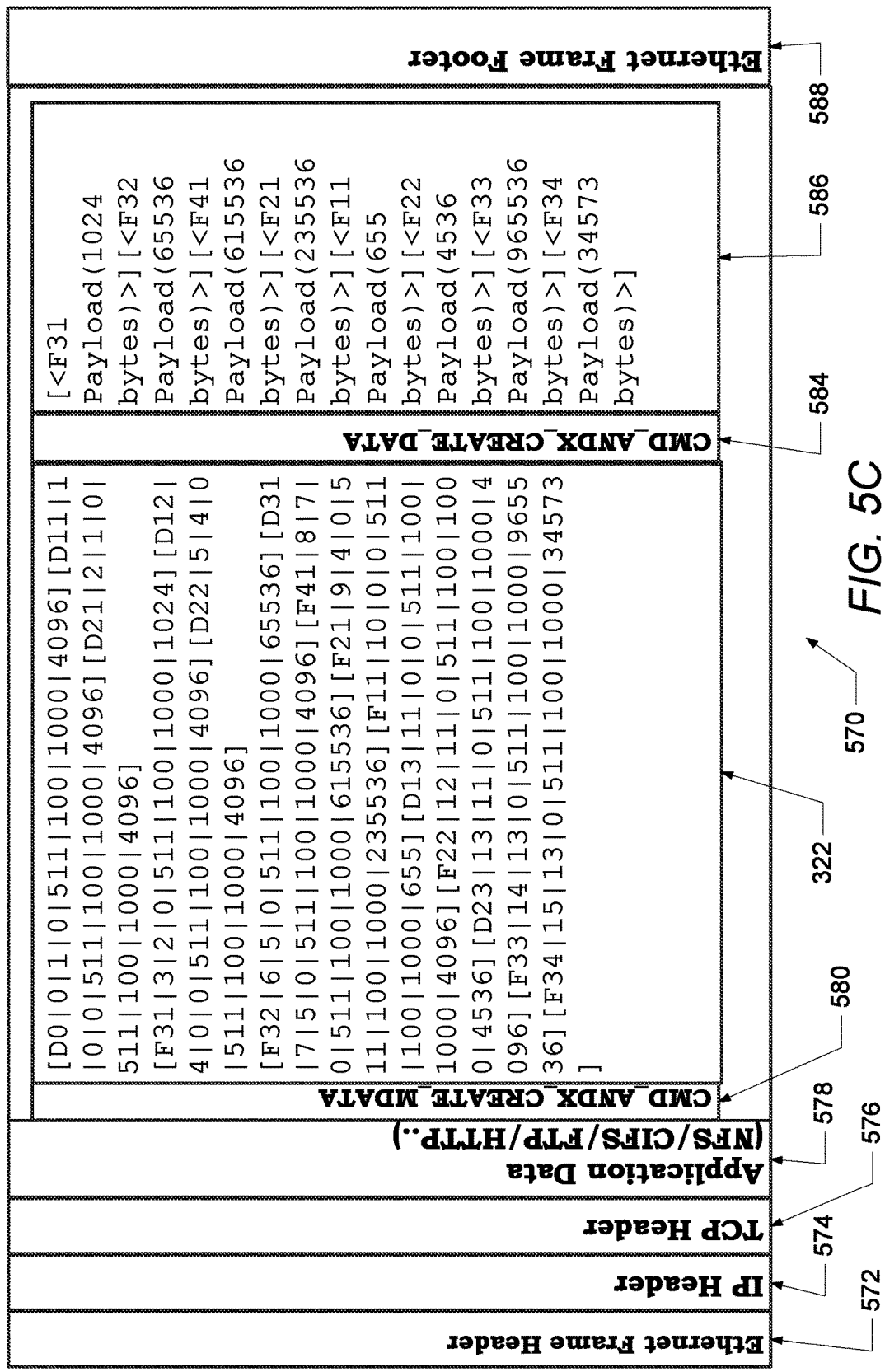
FIG. 5C illustrates an example network packet, in accordance with one embodiment.

FIG. 5C illustrates example contents of a network packet 570. Network packet 570 includes an Ethernet frame header 572, an IP header 574, a TCP header 576, an application data header 578, a create metadata command 580, the metadata 322, corresponding to directory 280, a create data command 584, the payload or data files 586 associated with directory 280 and an Ethernet frame footer 588. Network packet 570 holds the encoded i-node pattern (metadata 322) and payload data files 586 along with the two commands 580 and 584 in an application protocol section. The network packet 570 is transmitted from IHS 100 to server 252 via network 170.

Those of ordinary skill in the art will appreciate that the hardware and software/firmware components and basic configuration depicted in FIGS. 1-5B and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

In one embodiment, a first processor 102 and storage device 120 are communicatively coupled via northbridge controller 104. The first processor 102 has directory copying firmware 310 executing thereon to enable copying of a first directory A 280 containing files 540-546 and 524 from a client 205 to a target server 252. The firmware configures the processor 102 to receive a request to copy the first directory A 280 containing files 540-546 and 524 from storage device 120 to the target server 252 and to parse the first directory A 280 into an i-node tree 510. Metadata 322 corresponding to the i-node tree 510 is generated and transmitted from the client 205 to the target server 252. A second processor 202 at the target server 252 is triggered to generate a second directory A 282 based on the metadata 322 corresponding to the first i-node tree 510. The files 540-546 and 524 contained in the first directory A 280 are transmitted from the first storage device 120 to the target server 252.

Figure 6:
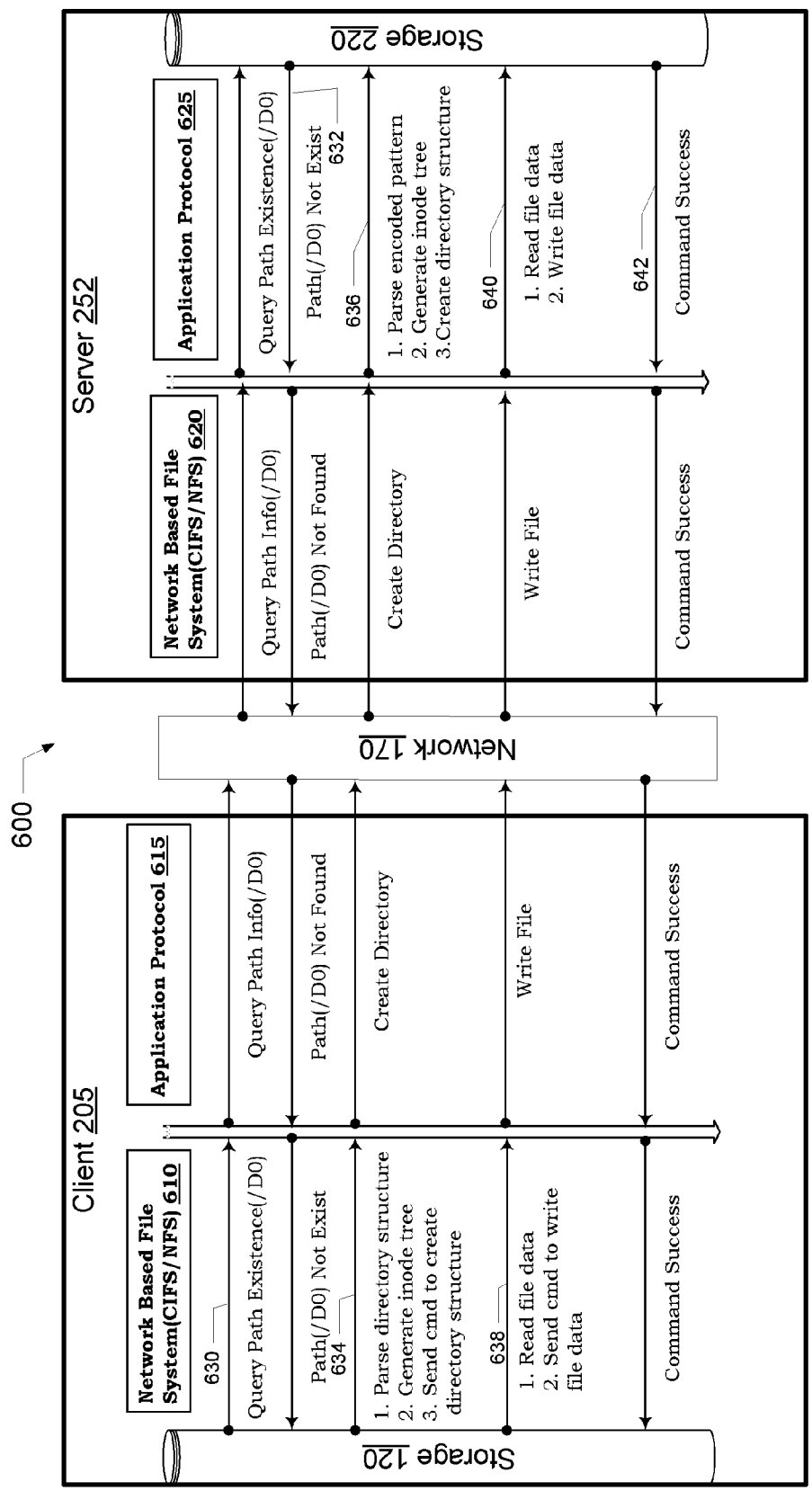
FIG. 6 is a sequence diagram of copying a directory containing files from a client to a target server.

FIG. 6 illustrates a sequence diagram 600 of copying a directory containing files from a client to a target server. In the description of FIG. 6, reference is also made to specific components illustrated within FIGS. 1-5C. Client 205 includes a common internet file system/Network file system (CIFS/NFS) module 610 and an application protocol module 615 that are stored on system memory 110. CIFS/NFS module 610 is a software/firmware module of distributed file system protocols that allows a user on client 205 to access files over a network 170 such as the internet. CIFS/NFS module 610 executes on processor(s) 102. Application protocol module 615 is a software/firmware module that specifies the shared protocols and interface methods used by communications network 170 to facilitate communications between client 205 and server 252. Application protocol module 615 executes on processor(s) 102.

Server 252 also includes a common internet file system/ Network file system (CIFS/NFS) module 620 and an application protocol module 625 that are stored on system memory 210 (FIG. 2). CIFS/NFS module 620 is a software/ firmware module of distributed file system protocols that allows a user on server 252 to access files over a network 170 such as the internet. CIFS/NFS module 620 executes on processor(s) 202 (FIG. 2). Application protocol module 625 is a software/firmware module that specifies the shared protocols and interface methods used by communications network 170 to facilitate communications between server 252 and client 205. Application protocol module 625 executes on processor(s) 202.

Directory copying firmware 310 executing within processor 102 initially receives a request to copy a directory 280 from storage device 120 to the target server 252. Processor 102 transmits to the target server 252 a query (step 630) to determine if directory A already exists on storage 220 of the target server 252. Processor(s) 202 of target server 252 determines if directory A 282 already exists on storage 220. If directory A 282 does not exist on storage 220, processor 202 transmits a response (step 632) to client 205 that directory A does 282 not exist on storage 220.

At step 634, processor 102 parses the first directory A 280 into an i-node tree 510, generates metadata 322 corresponding to the i-node tree 510 and transmits commands to the target server 252 to generate a second directory 282 based on the metadata 322 corresponding to the first i-node tree 510. In one embodiment, processor(s) 102 parses the first directory 280 into i-node tree 510 using a parsing algorithm such as a depth first search algorithm. A depth first search algorithm traverses or searches data structures starting at a root and explores as far as possible along each branch before backtracking. Processor 202 parses metadata 322, generates an i-node tree corresponding to the metadata, and generates directory 282 (step 636).

Processor 102 reads the folders 520, 522, 526, 530, 532, 534, and files 524, 540, 542, 544 and 546 contained in directory A 280 from storage 120. Processor(s) 102 generates a network packet 570 containing the metadata 322 and the payload or data files 586 associated with directory A 280 (i.e. folders 520, 522, 526, 530, 532, 534, and files 524, 540, 542, 544 and 546). Processor(s) 102 transmits the data files 586 to the target server 252 via network 170 (step 638). Also at step 638, the network packet 570 includes a command to target server 252 to write the received folders and files to directory 282 on storage 220.

Processor(s) 202 writes the received folders and files to directory 282 to complete copying or cloning of directory A 282 (step 640). If the received folders and files are successfully copied to directory A 282, processor(s) 202 transmits a message to client 205 that directory A has been successfully copied (step 642).

Figure 7:
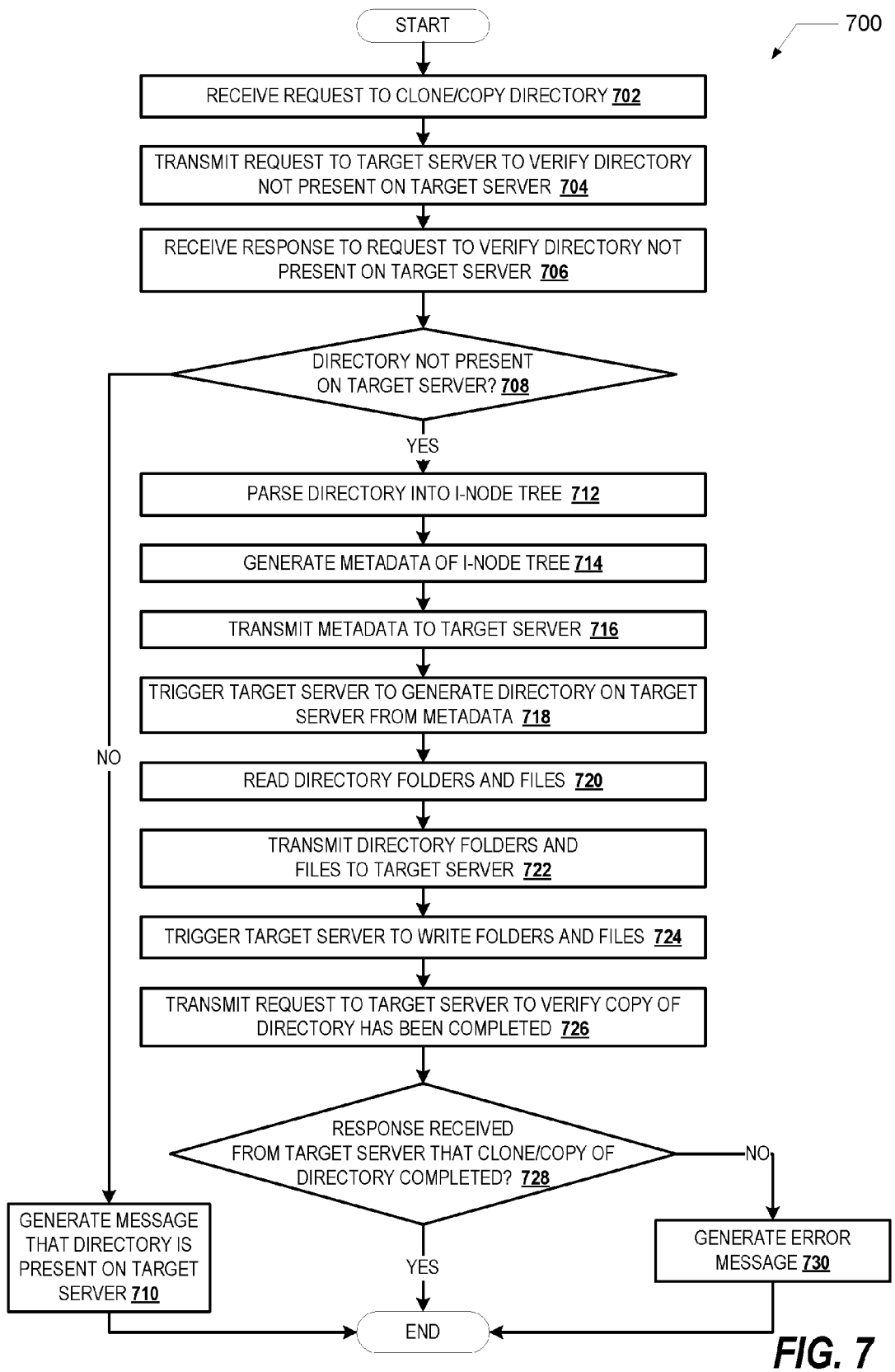
FIG. 7 is a flow chart illustrating one example of a method for copying a directory containing files from a client to a target server.

FIG. 7 illustrates a flowchart of an exemplary method 700 by which processor(s) 102 within the preceding figures performs different aspects of the processes that enable the one or more embodiments of the disclosure. Generally, method 700 represents a computer-implemented method for copying at least one directory 280 containing one or more data files from a client 205 to a target server 252. The description of method 700 is provided with general reference to the specific components illustrated within the preceding FIGS. 1-6. Generally, method 700 is described as being implemented via processor(s) 102 and particularly the execution of code provided by directory copying firmware 310 acting within processor 102. It is however appreciated that certain aspects of the described methods may be implemented via other processing devices and/or execution of other code.

Referring to the flow chart of FIG. 7, method 700 begins at the start block and proceeds to block 702 where processor 102 receives a request to copy or clone directory A 280 from storage 120. Processor 102 transmits to the target server 252 a request to identify if directory A is already stored on another storage device 220 of the target server 252 (block 704). Processor 102 receives a response from the target server 252 (block 706).

At decision block 708, processor 102 determines from the received response if directory A 282 is stored on storage device 220. In response to directory A 282 already being stored on storage device 220 of the target server 252, processor 102 generates a message indicating that the directory A is already stored on storage device 220 (block 710). If the directory A is already stored on storage device 220, processor 202 prevents directory A 280 from being transmitted to storage device 220 such that directory A 282 is not overwritten. Method 700 then ends.

In response to directory A 280 not being present on storage device 220 of the target server 252, processor 102 parses directory A 282 into an i-node tree 510 (block 712). Processor(s) 102 generates metadata 322 corresponding to the i-node tree 510 (block 714) and transmits the metadata 322 from the client 205 to the target server 252 via network 170 (block 716). Processor(s) 102 generates a network packet 570 containing the metadata 322 and the payload or data files 586 associated with directory A 280 that is transmitted to target server 252. Processor(s) 102 triggers processor(s) 202 at the target server 252 to generate directory A 282 based on the metadata 322 corresponding to the i-node tree 510 (block 718). Processor(s) 102 forwards a set of one or more commands to server 252 that triggers processor(s) 202 to parse the metadata 322, generate an i-node tree based on the metadata 322 and generate directory A 282 based on the i-node tree.

At block 720, processor(s) 102 reads the folders 520, 522, 526, 530, 532, 534, and files 524, 540, 542, 544 and 546 contained in directory 280 from storage 120. Processor 102 transmits the folders 520, 522, 526, 530, 532, 534, and files 524, 540, 542, 544 and 546 from storage 120 of client 205 to the target server 252 via network 170 (block 722). Processor(s) 102 transmits the data files 586. Processor 102 triggers processor 202 to write the received folders and files to directory A 282 on storage 220 (block 724). Processor(s) 102 transmits to target server 252 a request to identify if the copy of directory A 282 has been successfully completed and stored on storage 220 (block 726).

At decision block 728, processor(s) 102 determines if a response has been received within a pre-determined time period from target server 252 that directory A 282 has been stored on storage device 220. In response to directory A 282 not being successfully stored on storage device 220 of the target server 252 or the pre-determined time period having been exceeded, processor(s) 102 generates an error message indicating that directory A 282 has not been successfully stored on storage device 220 (block 730). In response to directory A 282 being successfully stored on storage device 220 of the target server 252, method 700 ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of copying a first directory containing a first plurality of files from a client to a target server, the method comprising:

parsing the first directory into a first i-node tree;
generating metadata corresponding to the first i-node tree;
transmitting the metadata from the client to the target server;
triggering a second processor at the target server to generate a second directory based on the metadata corresponding to the first i-node tree;
in response to receiving, from the target server, a confirmation that the second directory was generated: transmitting the first plurality of files contained in the first directory from the first storage device to a second storage device of the target server; triggering the second processor to write the first plurality of files as a second plurality of files contained in the second directory on the second storage device; and monitor for receipt, from the target server, of confirmation that the second plurality of files were written to the second directory of the second storage device; and
in response to not receiving confirmation within a predetermined time period that the second directory was generated and that the first plurality of files were written, as the second plurality of files, to the second directory of the second storage device, generating an error message.

2. The method of claim 1, further comprising:
transmitting to the target server a request to identify if the second directory is stored on the second storage device of the target server; and
in response to the second directory being stored on the second storage device of the target server, generating a message indicating that the second directory is already stored on the second storage device, wherein the second directory stored on the second storage device is prevented from being overwritten.

3. The method of claim 1, wherein triggering the second processor to generate the second directory further comprises forwarding a set of one or more commands that trigger the second processor to perform the functions of:
parsing the metadata via the second processor;
generating a second i-node tree based on the metadata; and
generating the second directory based on the second i-node tree.

4. The method of claim 1, further comprising converting the first i-node tree into an encoded pattern using a depth first search algorithm that traverses or searches data structures starting at a root and explores as far as possible along each branch before backtracking, wherein each i-node is converted into meta data.

5. A storage control system for copying a first directory containing a first plurality of files from a client to a target server, the storage control system comprising:
a first processor and a first storage device communicatively coupled to the first processor via a system interconnect, the first processor having firmware executing thereon to enable copying of the first directory containing the first plurality of files from the client to the target server, wherein the firmware configures the first processor to:
in response to receive a request to copy the first directory containing the first plurality of files from the first storage device to the target server, parse the first directory into a first i-node tree;
generate metadata corresponding to the first i-node tree;
transmit the metadata from the client to the target server;

trigger a second processor at the target server to generate a second directory based on the metadata corresponding to the first i-node tree;

in response to receiving, from the target server, a confirmation that the second directory was generated: transmit the first plurality of files contained in the first directory from the first storage device to a second storage device of the target server; trigger the second processor to write the first plurality of files as a second plurality of files to the second directory on the second storage device; and monitor for receipt, from the target server, of confirmation that the second plurality of files were written to the second directory of the second storage device; and in response to not receiving confirmation within a pre-determined time period that the second directory was generated and that the first plurality of files was written, as the second plurality of files, to the second directory of the second storage device, generate an error message.

6. The storage control system of claim 5, wherein the firmware further configures the first processor to:

transmit to the target server a request to identify if the second directory is stored on the second storage device of the target server; and in response to the second directory being stored on the second storage device of the target server, generating a message indicating that the second directory is already stored on the second storage device, wherein the second directory stored on the second storage device is prevented from being overwritten.

7. The storage control system of claim 5, wherein triggering the second processor to generate the second directory further comprises forwarding a set of one or more commands that trigger the second processor to perform the functions of:

parsing, via the second processor, the metadata;

generating a second i-node tree based on the metadata; and generating the second directory based on the second i-node tree.

8. An information handling system (IHS) comprising:

a first processor and a first storage device communicatively coupled to the first processor via a system interconnect, the first processor having firmware executing thereon to enable copying of a first directory containing a first plurality of files from a client to a target server, wherein the firmware configures the first processor to:

receive a request to copy the first directory containing the first plurality of files from the first storage device to the target server;

in response to receiving the request to copy the first directory:

parse the first directory into a first i-node tree;

generate metadata corresponding to the first i-node tree;

transmit the metadata from the client to the target server;

trigger a second processor at the target server to generate a second directory based on the metadata corresponding to the first i-node tree;

in response to receiving, from the target server, a confirmation that the second directory was generated: transmit the first plurality of files contained in the first directory from the first storage device to a second storage device of the target server; trigger the second processor to write the first plurality of files as a second plurality of files to the second directory on the second storage device; and monitor for receipt, from the target server, of confirmation that the second plurality of files were written to the second directory of the second storage device; and in response to not receiving confirmation within a pre-determined time period that the second directory was generated and that the first plurality of files was written, as the second plurality of files, to the second directory of the second storage device, generate an error message.

9. The information handling system of claim 8, wherein the firmware further configures the first processor to:

transmit to the target server a request to identify if the second directory is stored on the second storage device of the target server; and in response to the second directory being stored on the second storage device of the target server, generating a message indicating that the second directory is already stored on the second storage device and wherein the second directory stored on the second storage device is prevented from being overwritten.

10. The information handling system of claim 8, wherein triggering the second processor to generate the second directory further comprises forwarding a set of one or more commands that trigger the second processor to perform the functions of:

parsing, via the second processor, the metadata;

generating a second i-node tree based on the metadata; and generating the second directory based on the second i-node tree.

11. The information handling system of claim 7, wherein the firmware further configures the first processor to:

generate at least one network packet containing the metadata and the first plurality of files contained in the first directory.

* * * * *